FIG. 2

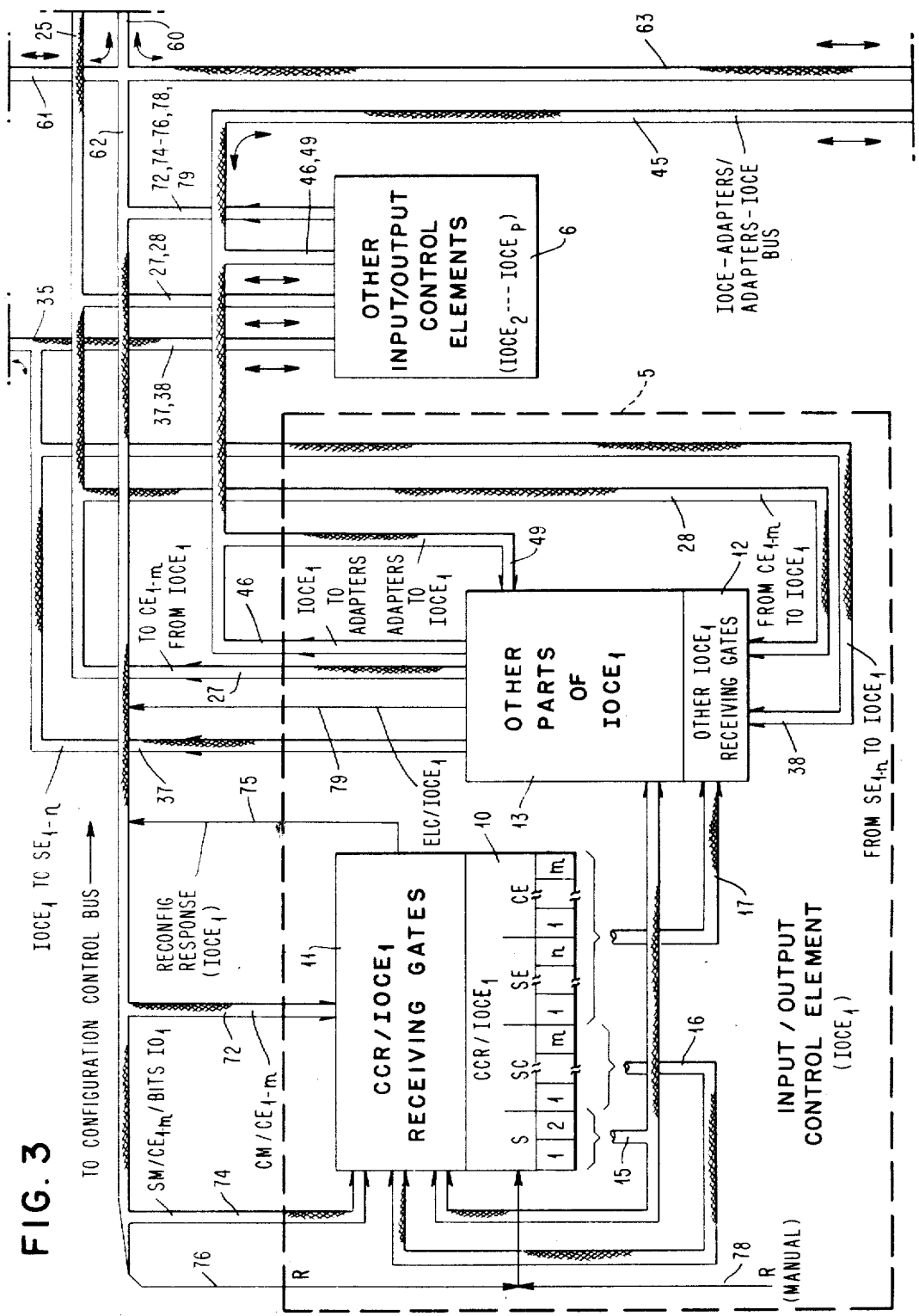

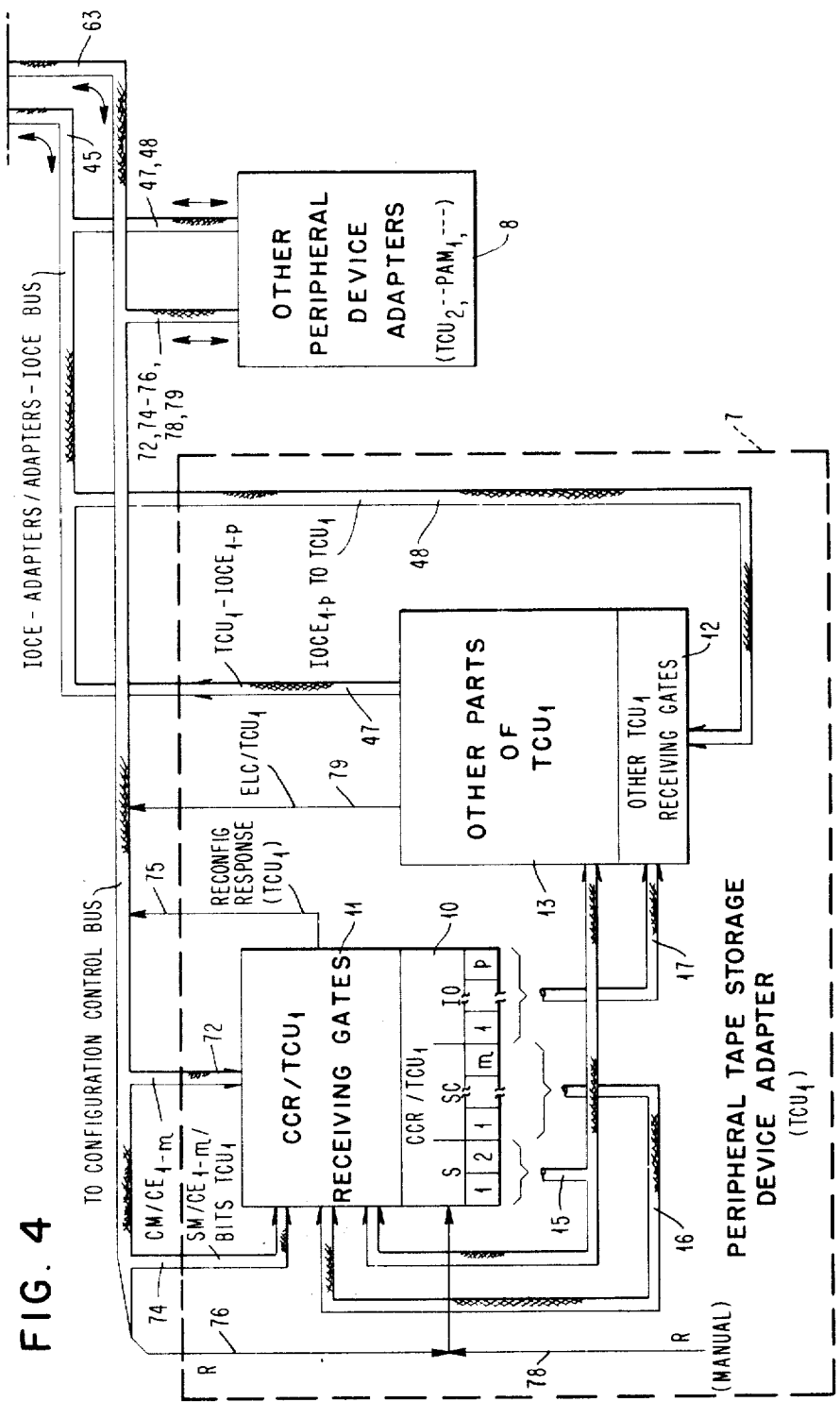

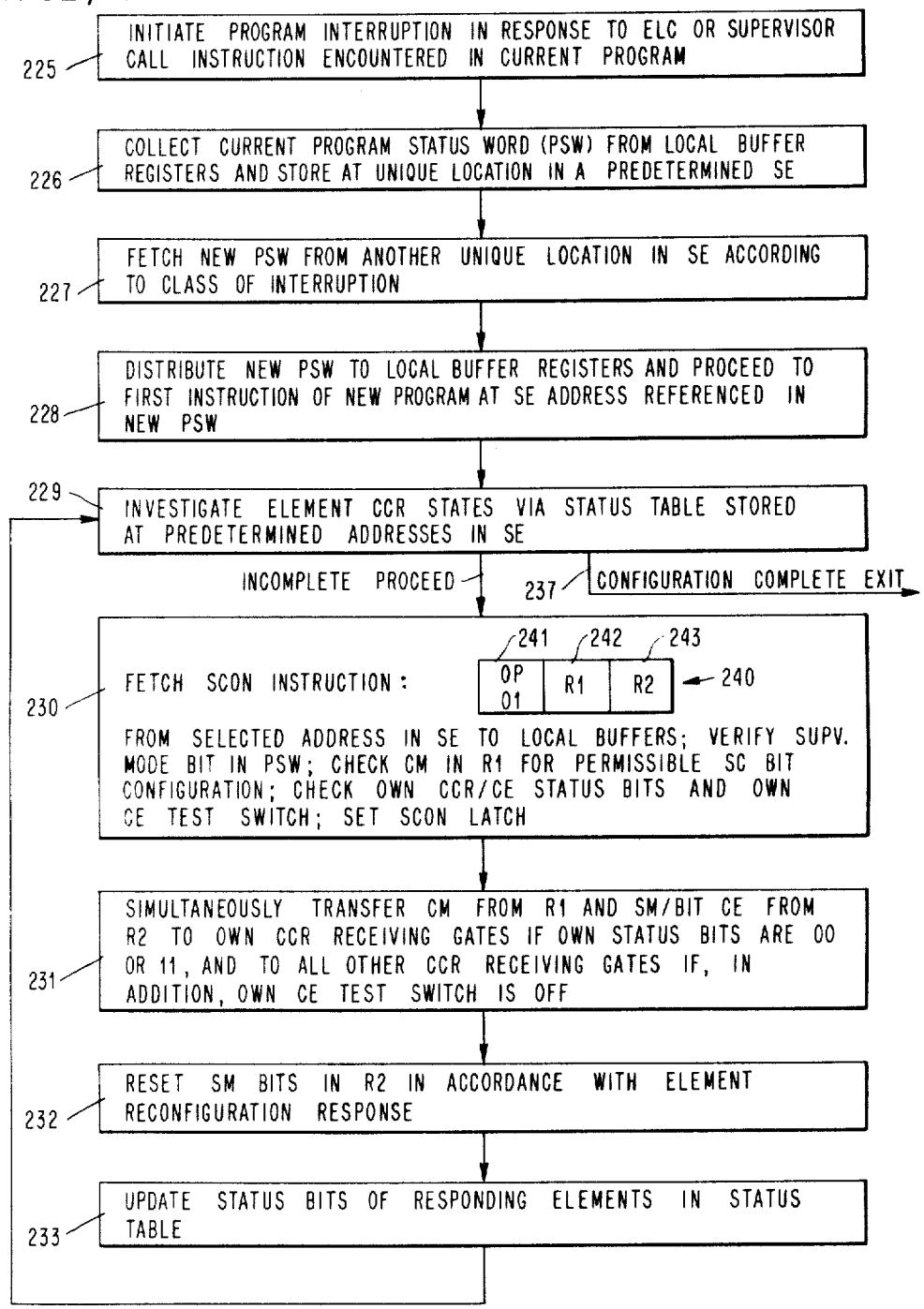

FIG. 15

| ELEMENT STATE | STATE BITS $S_0$ | STATE BITS $S_1$ | IF THE ELEMENT IS A CE CAN IT ISSUE SCON? | CAN ELEMENT ACCEPT SCON? | IF ELEMENT IS CE CAN IT MASK INCOMING ELC'S? (NOTE 4) | CE CONTROLS EFFECTIVE? (NOTE 5) | MAINT. CONTROLS EFFECTIVE? | POWER AND CCR CONTROLS EFFECTIVE? |
|---|---|---|---|---|---|---|---|---|
| THREE (OPERATIVE OR ACTIVE STATE) | 1 | 1 | YES | YES (NOTE 2) | YES | NO | NO | NO |
| TWO (STANDBY STATE) | 1 | 0 | NO (NOTE 1) | YES (NOTE 2) | NO | NO | NO | NO |
| ONE (STANDBY STATE WITH MANUAL CONTROL) | 0 | 1 | NO (NOTE 1) | YES (NOTE 2) | NO | YES | NO | NO |
| TEST STATE (TEST SWITCH "OFF") | 0 | 0 | YES | YES (NOTE 2) | YES | YES | YES | NO |
| TEST STATE (TEST SWITCH "ON") | 0 | 0 | YES; INTERNAL ONLY | NO (NOTE 3) | YES | YES | YES | YES |

NOTES:

1. IF A CE ATTEMPTS SCON, A SPECIFICATION CHECK INTERRUPT WILL RESULT. NO SIGNALS WILL ISSUE TO OTHER ELEMENTS.

2. RECEIVING ELEMENT MUST HAVE PROPER SCON BIT (SC) SET.

3. SCON'S WILL BE REJECTED REGARDLESS OF CCR, EXCEPT THAT A CE MAY ACCEPT SCON FROM ITSELF IF IT HAS ITS OWN SCON BIT SET.

4. THIS COLUMN APPLIES TO RECEIVING CE'S. ALL INCOMING CE ELC'S ARE MASKED BY SCON BITS IN RECEIVING CE'S. WHERE "YES" IS ENTERED, THE ELC MAY ALSO BE MASKED BY NORMAL INTERRUPT MASK CONTROLS. WHERE "NO" IS ENTERED, NO FURTHER MASKING IS POSSIBLE, AND UPON RECEIPT OF ELC FROM A CE THE STATE BITS IN THE CCR IN THE RECEIVING CE ARE AUTOMATICALLY RESET TO STATE THREE (11).

5. THESE ARE: IPL, INTERRUPT, STORE, DISPLAY, INSTRUCTION STEP, ADDRESS COMPARE.

FIG. 16

| ELEMENT | CCR/BIT $S_1$ | CCR/BIT $S_2$ |
|---|---|---|
| $CE_1$ | 1 | 1 |
| $CE_2$ | 1 | 1 |
| $CE_3$ | 1 | 0 |
| $CE_4$ | 0 | 0 |
| $SE_1$ | 1 | 1 |
| ⁓ | ⁓ | ⁓ |
| $SE_5$ | 1 | 1 |
| $SE_{6-11}$ | 0 | 0 |
| $SE_{12}$ | 0 | 0 |
| $IO_1$ | 1 | 1 |
| $IO_2$ | 1 | 0 |
| $IO_3$ | 0 | 0 |
| $PAM_1$ | 1 | 1 |
| $PAM_2$ | 1 | 1 |
| $PAM_3$ | 1 | 1 |
| $TCU_1$ | 1 | 1 |
| $TCU_2$ | 1 | 1 |
| $TCU_3$ | 1 | 1 |

3,386,082
CONFIGURATION CONTROL IN
MULTIPROCESSORS
Thomas S. Stafford, Wappingers Falls, Donald C. Burnstine, Hyde Park, Gerard T. Paul, Poughkeepsie, and John R. Rogaski, Woodstock, N.Y., assignors to International Business Machines Corporation, Armonk, N.Y., a corporation of New York
Filed June 2, 1965, Ser. No. 460,776
17 Claims. (Cl. 340—172.5)

ABSTRACT OF THE DISCLOSURE

The present multiprocessor apparatus includes, in effect, a distributed interconnection system such that failure of a portion of the interconnection system does not completely disable the apparatus. Each element—of a plurality of computing elements, a plurality of storage elements, and a plurality of other information processing elements of the total multiprocessor apparatus—is equipped with an individual Configuration Control Register for selectively controlling the flow of information between the respective element and other elements of the apparatus. For controlling the interconnection system represented by the Configuration Control Registers, with the redundancy necessary for reliable "fail-safe" operation of the system, each of a plurality of computing elements is provided with means for independently developing, selecting and conditioning signals and with means for broadcasting these signals to all elements of the apparatus, including the originating element. The selecting signals are utilized at the receiving elements to selectively limit application of the conditioning signals only to Configuration Control Registers of elements designated by the selecting signals, such elements having been predetermined by the originating computing element. The conditioning signals serve to condition the Control Registers of the selected elements to desired states of information flow control also predetermined by the originating computing element.

---

The invention hereof pertains to the control of interconnections between independent elements of a multiprocessing complex. In particular, it pertains to a system of connection controls which can be used to reliably maintain continuity of data processing operations and efficient distribution of element work load assignments within a multiprocessing complex in a variety of problem situations.

In certain real-time data processing situations for example in the processing of air traffic control data, it is necessary to maintain substantial continuity of operation in order to avoid loss of data when circuit failures or other causes of processing bottlenecks are imminent or have actually occurred. It is conventional in this regard to provide duplicate system elements which may be maintained available, on a standby or other basis, to be switched into an active processing system as a substitute for a failing element or to back up an element which is being overloaded with two many tasks. The weak link in this procedure has been the means used to accomplish the switching in of the back-up element and, if need be, the disconnection of the failing element. Hitherto, the practice has been to provide a centralized arrangement of master switching controls which, in response to signals indicating an element failure, or other condition requiring attention can act to switch in back-up elements so as to reorganize the processing system, or systems, then in operation. One problem associated with this form of control is that the master switching controls themselves are susceptible to failures capable of interrupting operations and causing irreparable loss of both data and data processing time.

It is, of course, possible to provide for manual disconnection of the master controls and the inter-element switches when a failure occurs. However, when time is of the essence, manual control is inadequate since seconds, or even minutes, might elapse between the time of occurrence of a failure and the disconnection of the master controls, during which time thousands of misrouted data transfers may occur with consequent loss of much data and disruption of data processing operations currently in progress.

Accordingly, an object hereof is to provide an improved system for controlling the configuration of interconnections between elements of a multiprocessing complex.

Another object is to provide a system for controlling interconnections between elements of a multiprocessing complex which can be adapted to selectively reorganize interconnections between elements to maintain processing operations within the complex at a prescribed level of efficiency, continuity and reliability.

Another object is to provide a system for efficiently controlling interconnections between elements of a multiprocessing complex which can be expected to effectively maintain continuity of data processing operation during ordinary system failures.

Yet another object is to provide a system for efficiently controlling interconnections between elements of a multiprocessing complex which can be expected to reliably maintain continuity of processing operation during malfunctioning of any element of the complex including an element which can exercise supervisory control over all interconnections within the complex.

Another object is to provide a system for efficiently controlling interconnections between elements of a multiprocessing system including check features which preclude erroneous initiation of a change in interconnections or underisable acquiescence by an element in a proffered change.

A feature of the subject configuration control system resides in the provision, within each of a plurality of computing elements of a multiprocessing complex, of means capable, under prescribed conditions, of effecting changes in the states of receptiveness of any elements of the complex to signals transmitted thereto from other elements of the complex. Subject to certain restrictions any computing element can transmit configuration control signals which are selectively received by the other elements of the complex and determine the states of receptiveness of the receiving elements. It is thus unnecessary to disconnect power from a faulty element to render other elements insensitive to it and by appropriately configuring states of receptiveness, the processing tasks of a faulty element can be reassigned to a health standby element, or added to the duties of an actively functioning element. Since such configuring can be accomplished automatically in response to a fault indicating signal it is possible to maintain continuity of processing when a failure occurs. It is even possible to allow a faulty element to continue to transmit signals externally while it is undergoing diagnostic testing or other maintenance procedures without risk of disrupting data processing operations currently in progress. Of perhaps equal significance, processing bottlenecks, due to assignment of too many tasks to one computing element can be anticipated and another computing element can be programmed to automatically step in and reconfigure the system so as to relieve the overloaded element while the latter remains free to continue its necessary activities without interruption.

Another feature herein is that internal to each element of the complex there is provided a configuration control register (abbreviated CCR) having output control connections to gates which receive and pass signals transmitted by other elements. Thus, the receptiveness of an element to transmissions of other elements is a function of the present state of its CCR. The inputs of any CCR, subject to the output states of certain bits therein, are accessible to each computing element of the complex. Thus the content of any CCR, including a computing element CCR, may be selectively changed by any one of the computing elements.

Another feature is that each element can transmit an element check signal (ELC) in response to which the computing elements can initiate a reconfiguration program leading to modification of selected CCR's and consequent reorganization of the complex. In response to an ELC those computing elements enabled by bits in their respective CCR's to receive from the element transmitting the ELC select one of their number to issue a program of reconfiguration signals. These signals establish new information settings in selected CCR's, including, if need be, the CCR associated with the element issuing the ELC signal. The issuance of an ELC signal may be conditioned upon the results of parity checks, power supply checks, logic checks, work load checks or checks of any other element condition which is sufficiently pertinent to system operations to warrant consideration of a reconfiguration program.

The program instruction executed by a computing element to reorganize element system assignments within the complex—i.e., to modify selected CCR's—is referred to herein as SCON (abbreviation for "Set Configuration"). Programs containing such instructions are strategically located in a plurality of storage elements of the complex on a redundant basis so that failure of any one storage element will not prevent reconfiguration of the complex.

In response to an element check or other condition calling for possible reconfiguration of a system, one of the enabled computing elements determines the condition of the complex, and if circumstances warrant further action, it retrieves one or more appropriate SCON instructions from an associated storage element and executes them. Under the direction of the selected SCON instruction, the computing element issues a reconfiguration signal, known as a configuration mask (CM), and an element selection signal, or selection mask (SM). The CM signals are selectively accepted as new CCR entries by the elements designated by SM.

The foregoing and other objects and features of the invention will be more fully understood and appreciated upon consideration of the following description thereof taken with reference to the accompanying drawings wherein:

FIGS. 1–4, when arranged according to the plan shown in FIG. 5, constitute a schematic illustration on a general level of a multiprocessing complex including a configuration control system organized in accordance with the present teachings;

FIGS. 6–9, inclusive, provide diagrammatic illustrations of the format of the configuration mask information stored in the configuration control registers (CCR's) associated with the different types of elements shown in the complex of FIGS. 1–4;

FIG. 14 is a schematic flow diagram of a sequence of operations executed internally by a computing element in connection with the handling of a SCON instruction;

FIG. 15 contains a table which defines the operational capabilites of each element with reference to certain status bits (S) contained in the CCR internal to the element;

FIG. 16 illustrates a typical stored status table listing the current status bits of all element CCR's of a complex. This table may be used as a stored reference by a CE in connection with the Instruction Fetching routine to determine its selection of a SCON instruction for execution.

GENERAL DESCRIPTION

Figure 1:
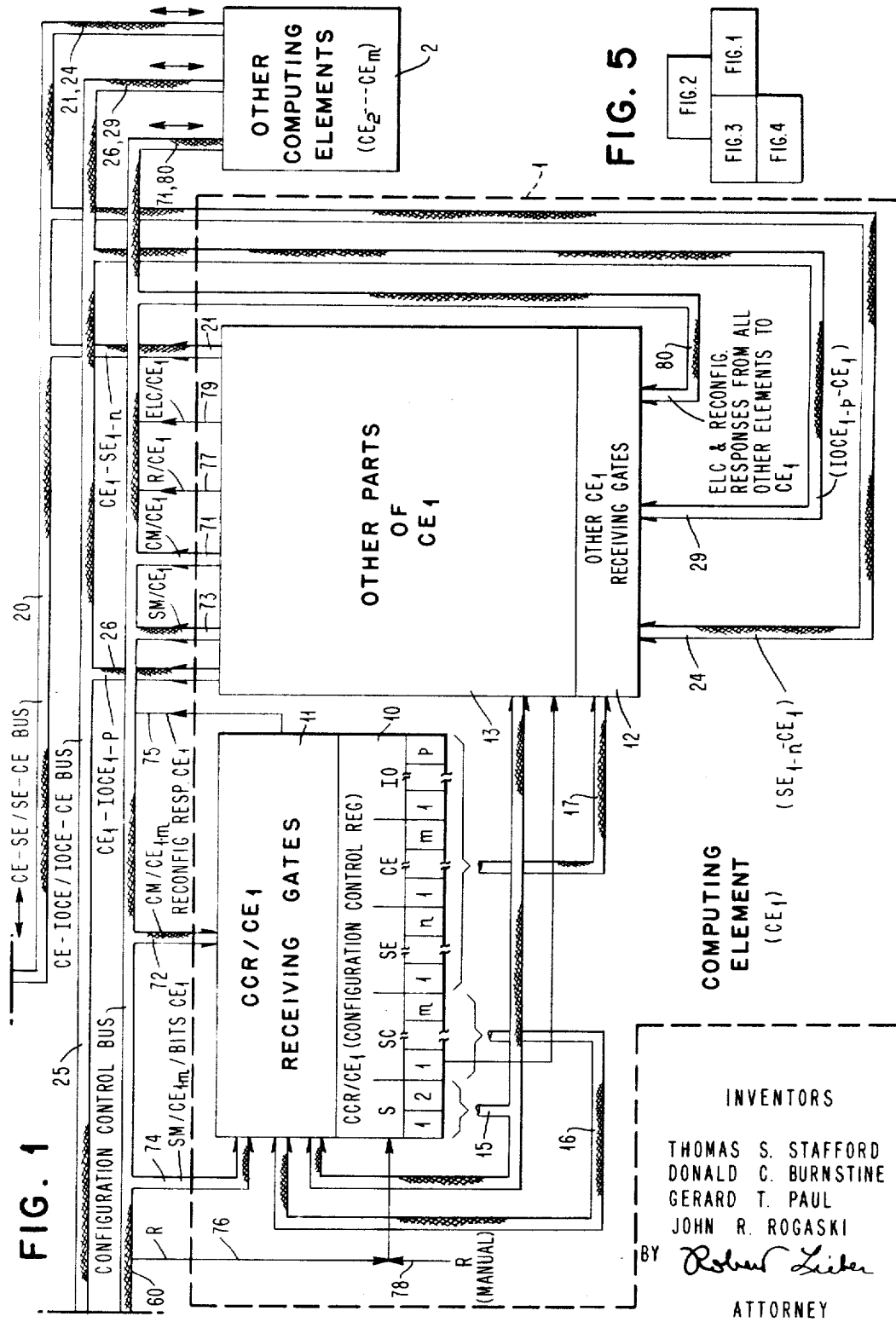
Figure 2:
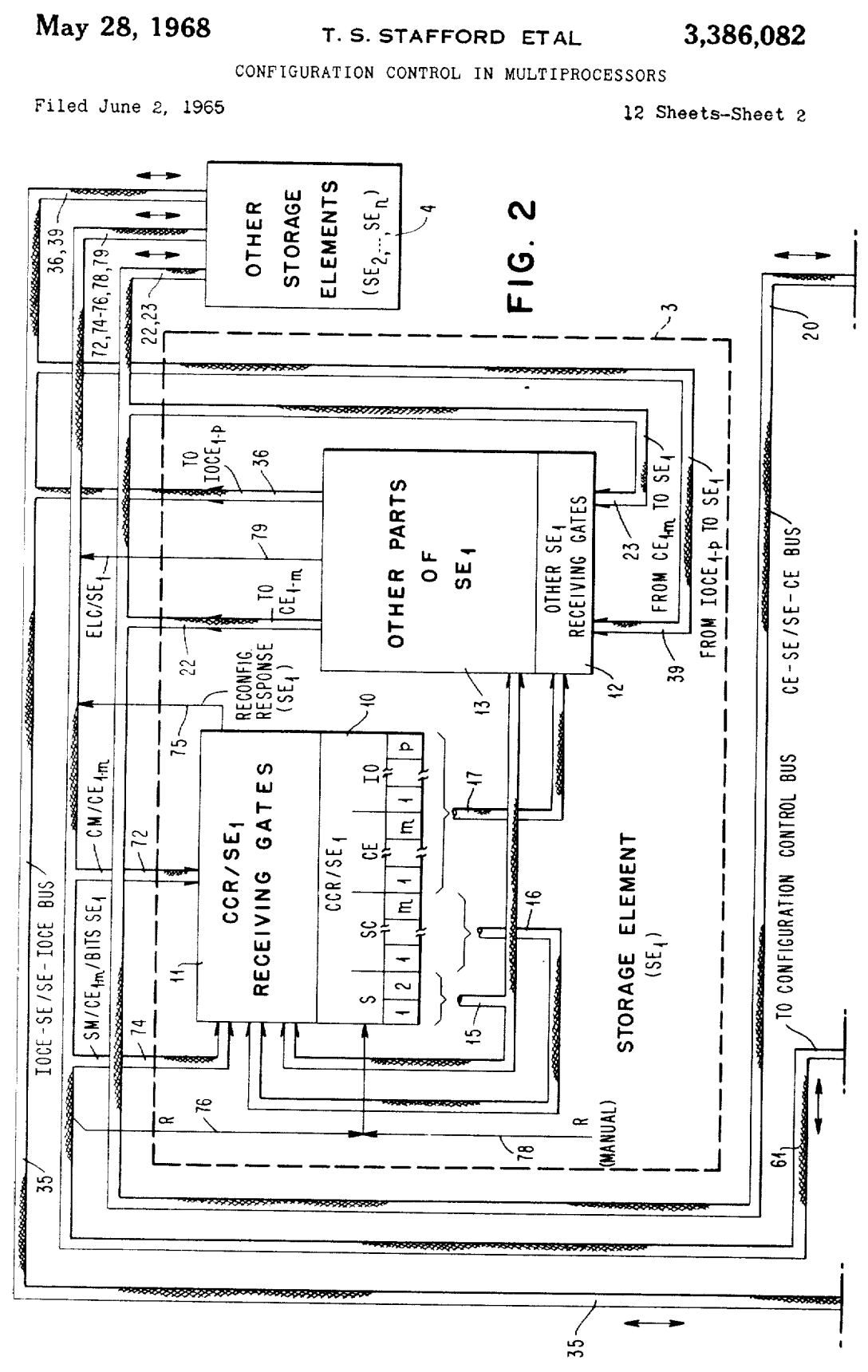
Figure 6:
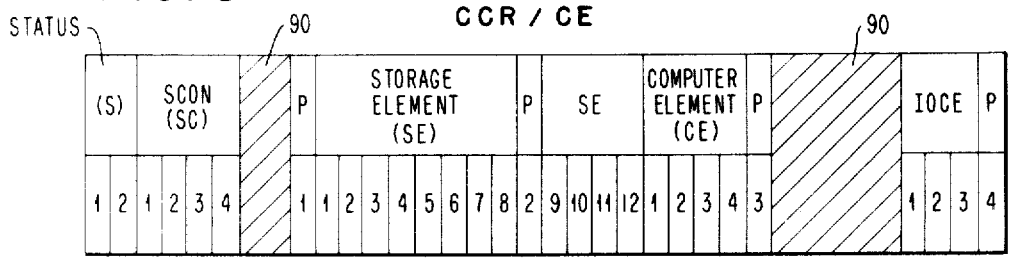
Figure 7:
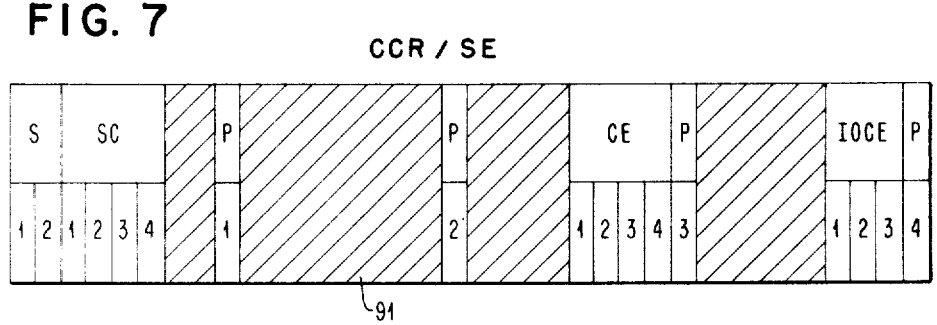
Figure 8:
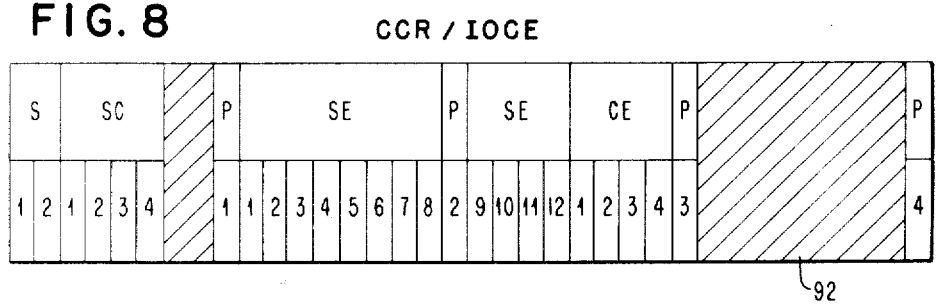
Figure 9:
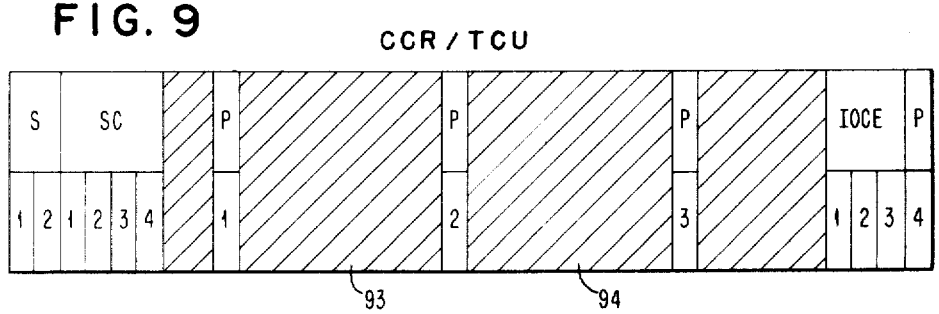

As shown in FIGS. 1–4, a muliprocessing complex of the type under consideration herein typically may include a plurality of computing elements (CE), shown at 1 and 2 in FIG. 1, and may include a plurality of other specialized elements, such as storage elements (SE), shown at 3 and 4 in FIG. 2, input-output control elements (IOCE or IO) shown at 5 and 6 in FIG. 3, and peripheral adapter elements 7, 8 (FIG. 4).

The adapter elements are each connected to a plurality of peripheral devices such as tape stores, communication terminals, printing devices, and the like. The tape store adapter units are hereinafter designated by the symbol TCU (abbreviation for tape control unit) and other peripheral device adapters are designated by the letters PAM (abbreviation for peripheral adapter module).

As may be inferred from the descriptive terminology used above, CE's perform processing operations on internal programs and information supplied by SE's and IOCE's provide a link for exchanging information between the SE's and external input and output devices via the additional buffering afforded by the adapter elements.

Each element is provided with a configuration control register 10 (abbreviated CCR), two sets of receiving gates 11, 12 and other internal components 13 collectively denoted "other parts." These other parts may include individual power supplies. To simplify FIGS. 1–4, only the internal organizations of representative elements, $CE_1$, $SE_1$, $IOCE_1$ and $TCU_1$, are shown. It should be understood that the internal organizations of other elements in each category would be similar to those of the representative elements.

The receiving gates 11 control the introduction of new information settings into the respective CCR's, and the receiving gates 12 control the reception of other information by the other internal circuits 13 of the respective elements. The receiving gates 11 and 12 of each element are controlled by various digit outputs of the associated CCR as indicated by lines 15, 16 and 17. Thus, all incoming information signals proffered to an element can be selectively received or rejected by the element in accordance with the contents of its associated CCR. An exception to this is found in the IOCE elements. Information proffered to an IOCE 5, 6 by a peripheral adapter unit 7, 8 is permitted to bypass the receiving gates 12 controlled by CCR/IOCE. This is because there are other internal receiving gates in each IOCE, not controlled by CCR/IOCE, which nevertheless prevent unauthorized reception of information transmitted from an adapter.

The "other parts" 13 of each SE, 3, 4, include a fast access store, such as a magnetic core matrix memory, and access controls for reading and writing information relative thereto.

The "other parts" 13 of each CE include computing and control circuits, for operating upon stored program instructions and data stored in an SE, for executing SCON instructions and selectively issuing configuration control information to the CCR's, and for handling the acknowledging responses of elements intended to have their CCR's reconfigured by such information.

The "other parts" of each IOCE include one or more channel systems for selectively conveying information bidirectionally between peripheral device adapters (TCU, PAM) and SE's, according to the needs of the CE's.

Data and control signals not directly connected with configuration control are exchanged between a CE and an SE via group bus 20, one of the tributary buses 21 (FIG. 1) or 22 (FIG. 2) feeding into bus 20, and one of the branch buses 23 (FIG. 2) or 24 (FIG. 1) extending from the group bus.

Data and control signals not directly connected with configuration control are handled between CE and IOCE units via group bus 25 (FIGS. 1 and 3), one of the tributary buses 26 (FIG. 1) or 27 (FIG. 3) feeding into group bus 25, and one of the branch buses 28 (FIG. 3) or 29 (FIG. 1) respectively, extending out of the group bus.

Data and control signals not directly connected with configuration control are handled between SE and IOCE units via group bus 35, one of the tributary buses 36 (FIG. 2) or 37 (FIG. 3), and one of the respective branch buses 38 (FIG. 3) or 39 (FIG. 2).

One other path for the handling of data and control signals is that between the IOCE units (FIG. 3) and peripheral adapter units (FIG. 4). It includes paths defined by group bus 45, one of the tributary buses 46 (FIG. 3) or 47 (FIG. 4), and a respective branch bus 48 (FIG. 4) or 49 (FIG. 3).

Each element of a group of elements having tributary buses feeding a group bus can transmit signals selectively to any element of a group having branch buses extending from the same group bus. Thus, any of the $m$ computing elements, $CE_{1-m}$, can selectively send information to and receive information from any one of the $n$ storage elements $SE_{1-n}$, via group bus 20 and appropriate ones of the tributary and branch buses 21–24. Hereafter, the foregoing connections will be referred to as "data paths" to distinguish them from configuration control information handling connections between CE's and CCR's, referred to as "configuration control paths." The latter paths are described in greater detail below.

Means not shown are provided for resolving conflicts created by conflicting calls for service by two or more elements from a single element; for example, simultaneous calls by two or more CE's for access to the same SE. Such means act to assign priority to a unique one of the calling elements according to a predetermined plan. Since this priority assignment plan is not pertinent to the configuration control system of the present invention it is deemed unnecessary to provide further details thereof in this discussion.

The following brief example will suffice to complete the description of the data paths. Suppose $CE_1$ is engaged in executing a program stored in $SE_5$ and wishes to retrieve its next instruction from an Instruction Address IA in $SE_5$. $CE_1$ raises a call line, in a path 21, 20, 23, between $CE_1$ and $SE_5$, and transmits a representation of the address IA, along other lines in the same path. At some later time $SE_5$ runs through a non-destructive read/regenerate cycle of access to internal address location IA. Upon readout of the contents of IA, $SE_5$ raises a response line in the data path 22, 20, 24 between $SE_5$ and $CE_1$ while at the same time transmitting the contents of IA to a special buffer register in $CE_1$ via other lines in the same path. The response signal is used by $CE_1$ to reset its call signal and the exchange is completed.

Signals participating in the establishment of new configuration control settings in CCR register 10 are handled through a configuration control bus system including a main group bus 60 (FIG. 1), subgroup buses 61 (FIG. 2), 62 (FIG. 3), 63 (FIG. 4), and a plurality of tributary and branch buses and lines as described below. While any element may initiate a request (ELC) for action which may result in a new CCR setting, only a CE (FIG. 1) can issue the actual CCR setting information, hereinafter termed configuration mask (abbreviated CM). Thus, each CE is provided with a CM output bus such as the bus 71 extending from $CE_1$ (FIG. 1), and each element CCR is provided with a CM input bus 72 for carrying a CM from any CE to the receiving gates 11 of that CCR.

An abbreviated form of notation is employed herein to characterize the information units pertinent to a reconfiguration process. In general this notation has the form: $A/B/C$, where A represents the information unit, B represents the issuing source, and C specifies particular bits in A. Thus, the notation employed for example to designate particular bits $a$, $b$ of a 36-bit CM word issued by $CE_3$ would be $CM/CE_3/bits\ a,\ b$.

As indicated above, a CM word issued by a CE unit via a CM output bus, such as 71 (FIG. 1) would be applied in parallel to the CCR receiving gates 11 of all elements in FIGS. 1–4 via respective CM branch buses 72 extending in parallel to all the inputs of such gates. Thus, the notation $CM/CE_{1-m}$ at 72 indicates that all CM/CE outputs extend as inputs via 72.

Those elements which are intended to receive an issued CM are designated by corresponding bits in a coincidentally issued Selection Mask word (SM). The latter is provided by the CE issuing CM on its associated SM/CE output bus 73. Thus, the gates 11 of $CCR/CE_1$ (FIG. 1), $CCR/SE_1$ (FIG. 2), $CCR/IOCE_1$ (FIG. 3), and $CCR/TCU_1$ (FIG. 4), are respectively selected by the conditions of bits designated bit $CE_1$, bit $SE_1$, bit $IO_1$, and bit $TCU_1$, in an SM word. Since such SM words may issue from any of $m$ source CE's, a separate SM bit line is extended from the bus 73 of each CE to each group of element CCR gates 11. Thus, the lines 74 extending to the gates 11 of CCR/CE in FIG. 1 can convey a $CE_1$ selecting bit of an SM word issued by any CE (including $CE_1$) to the receiving gates 11 of $CE_1$, as indicated by the notation $SM/CE_{1-m}/bits\ CE_1$. Similarly, the lines 74 extending to $SE_1$ (FIG. 2) convey $SE_1$ selecting bits of SM words to the $SE_1$ receiving gates 11 as indicated by the notation $SM/CE_{1-m}/bits\ SE_1$. Likewise in FIG. 3, the notation $SM/CE_{1-m}/bits\ IO_1$ adjacent bus 74 indicates that the $IO_1$ selecting bits of all SM words are conveyed to the gates 11 of $IOCE_1$. Finally, in FIG. 4, $SM/CE_{1-m}/bits\ TCU_1$ indicates that a $TCU_1$ selecting bit in each SM word is conveyed thereby to gates 11 of $TCU_1$.

It should be understood that the SM selecting bits are binary-valued signals which in different binary states will tend to actuate or not actuate respective gates 11. It may further be inferred by noting the lines 15 and 16 extending from each CCR to the gates 11 that each CCR can selectively accept or reject a proffered CM (i.e., a CM accompanied by an active selecting bit of an SM on a line 74) in accordance with the information currently stored in the CCR. The lines 15 issue from a pair of status bit stages ($S_1$, $S_2$) of each CCR, the combined states of which determine four element states: 00, 01, 10, and 11. The lines 16 issue from individual supervisory control bit stages ($SC_{1-m}$) of the respective CCR, and correspond individually to the different CE elements of the complex. Signals on line 16 control acceptance of incoming CM's proffered by SM selecting bits of respective CE units. The status bits S determine whether the associated CCR is in a state permitting acceptance of a proffered CM, and if the state is such a permissive one, the control bits SC selectively determine the CE's from which a CM may be accepted (i.e., the element selecting bits of SM to which the gates 11 may react). An element accepting reconfiguration signals its acceptance of the proffered CM to the issuing CE via an individual response line 75. Failure to receive such a response from any element designated by SM is taken as an indication of program error, or other failure, by the issuing CE.

Figure 10:
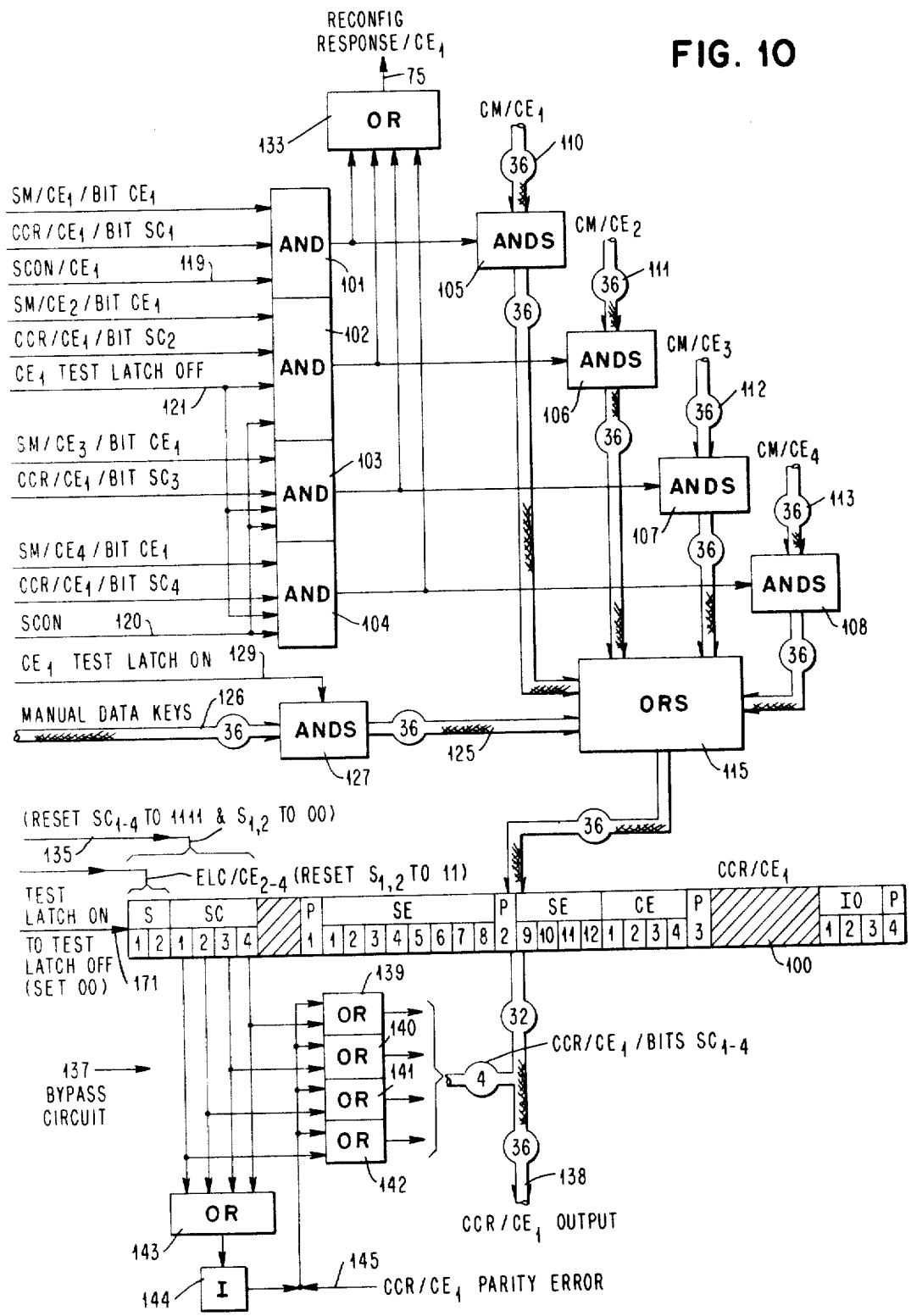
FIG. 10 is a schematic of a representative computing element configuration control register (CCR/$CE_1$) and access controls therefor.

Over-riding control over the S and SC bits in each element CCR is afforded by reset (R) input lines 76 which are coupled to reset output lines 77 issuing from the CE's (FIG. 1) by manual reset controls 78, and by SC "bypass" circuits which are not shown in FIGS. 1–4. The latter circuits which are considered in detail in connection with the discussion herein of FIG. 10 are effective to force all SC bit outputs of CCR to the 1 condition when all SC bits are coincidentally set to 0. The effect thus produced is the same as if all SC bit states in the CCR had been set to 1. Were it not for this, if all SC bits in CCR became coincidentally set to 0 due to some faulty condition the CCR of the associated element would become isolated from further reconfiguration control.

Each element is further provided with an Element Check signalling line (ELC) 79 by means of which the existence therein of an error or other condition requiring attention is made known to the CE's. Recall that the CE states (S) are so maintained that at least two CE's will be able to respond to the ELC. Thus invariably one CE will respond to the ELC, execute SCON, assemble CM and SM, and thereby reconfigure the complex. In response to an ELC signal which is a pulse of short duration, subject to certain checks and priority resolution procedure described hereafter, one of the enabled CE's other than a CE originating an ELC, will perform a program routine to evaluate the cause of the error or failure which gave rise to the ELC signal. This one CE will then assemble and forward SM and CM words under control of SCON instructions through the bus system described above. These words condition the selected CCR's and thereby reconfigure the complex. Assuming that the SCON instructions are appropriately programmed the data processing operations in progress prior to the ELC may be continued without significant interruption.

The response and ELC output lines 75 and 79, of all elements are extended in parallel via branch buses 80 (FIG. 1) to the receiving gates 12 of each CE.

The general effects characteristic of a reconfiguration process as executed by the apparatus shown in FIGS. 1–4 may now be summarized as follows:

First, one or more CE's are made aware by an ELC or an internal condition, such as a decoded program instruction or manual switch setting, of a problem condition. After executing several internal checks to determine whether they can legitimately issue reconfiguration information, the CE's attempt to gain access to a predetermined one of several SE's containing information pertinent to reconfiguration. By executing a priority resolution procedure these CE's enable a unique one of their number to address the SE and withdraw therefrom a status table containing a listing of the status bits (S) currently stored in all CCR's of the complex. Utilizing this status intelligence the enabled CE exchanges other program information with an associated SE to determine a configuration of the complex suitable for maintaining continued processing. Branch decisions in this program guide the controls of the enabled CE to selectively address and execute one or more SCON (Set Configuration) instructions in SE appropriate to the circumstances. Each SCON instruction is retrieved and used by the enabled CE to control a corresponding internal subroutine during which appropriate CM and SM words are assembled in CE registers. Thereupon, the CM word is broadcast towards all elements via bus 60 and proffered to selected elements according to the coincidental states of corresponding selecting bits of SM. Those elements designated by SM which are permitted by the S and SC bits in their CCR's to accept the proffered CM do so and acknowledge their acceptance by a signal sent to the issuing CE via the response line 75. The response signal is utilized by means not shown in the issuing CE to reset the corresponding SM selecting bit in the CE register preloaded with the SM word.

When the mask issuing CE determines, by internal controls further considered herein, that all elements designated for reconfiguration by one or more SM's have accepted the correspondingly proffered CM, and therefore verified that the complex has been suitably reconfigured, it may terminate its execution of SCON instructions and resume operation as part of a processing subsystem within the complex, retrieving its next program instruction from an SE to which it is configured by a corresponding SE bit in its CCR.

It will be noted that the output lines 17 of each CCR control the receiving gates 12, of the associated elements, through which all information, other than configuration control information, or adapter information proffered to an IOCE, reach the internal parts 13 of the associated element. Thus, it will be understood that outputs of any CCR connecting to respective lines 17 control reception of information transmitted to the associated element from other elements and thereby the CCR contents in effect determine all signal flow between elements of the complex. A feature of this reception control is that a faulty element, even if it should become isolated from reconfiguration control and continue to transmit erroneous information, can still be cut off from all "healthy" elements of the complex by reconfiguration, i.e., by changing a bit in each "healthy" element's CCR.

CCR FORMATS

Considering FIGS. 6–13, with reference to the complex shown in FIGS. 1–4, organizational details of the subject configuration control system may now be explained. FIGS. 6–9 show the relative formats of the control information stored in the respective CCR's of the CE, SE, IO, and adapter elements. The information in each CCR consists of selected parts of a basic 36-bit control word or CM format.

In the particular embodiment of a multiprocessing complex described herein, there are provided four CE's, a maximum of 12 SE's, and a maximum of 3 IOCE's (i.e., $m=4$, $n=12$, and $p=3$). Accordingly, each CCR contains four supervisory control bit stages ($SC_{1-4}$) the outputs of which control acceptance of a new CM proffered by corresponding ones of $CE_{1-4}$. Each CCR also contains a pair of status bit stages ($S_{1, 2}$) and from one to four parity bit stages ($P_{1-4}$). Each parity bit stage holds the anticipated correct parity of the 8 consecutive bits to the left thereof in the CCR and may be compared to a computed parity as a check on the correctness of those 8-bits.

In CCR/CE (FIG. 6) there are 12 bit stages, designated $CCR/CE_1$/bits $SE_{1-12}$, which have outputs controlling the receipt by the associated CE of intelligence forwarded by respective storage elements $SE_{1-12}$ of the complex. There are also 4 bit stages $CE_{1-4}$ controlling receipt by the particular CE of intelligence conveyed from correspondingly numbered CE's, and bit stages $IOCE_{1-3}$ (or $IO_{1-3}$) for controlling acceptance by the particular CE of signals originated by corresponding IOCE's. The seven blank bit positions 90, distinguished by a pattern of parallel slanted lines, are considered spare or "don't care" positions since the outputs therefrom do not control receiving gates.

CCR/SE (FIG. 7), in addition to S, SC and P bit stages contain bit stages $CE_{1-4}$ and $IO_{1-3}$, corresponding to the CE and IO bit stages in CCR/CE (FIG. 6) for controlling acceptance by SE of signals conveyed from receptive CE's and IOCE's. All other bit positions are spare (unused). Since the eight positions 91 to the left of $P_2$ are blank all of the nine stages 91 and $P_2$ are unnecessary and may be omitted.

CCR/IOCE (FIG. 8) in addition to bit stages denoted S, SC and P, contain bit stages $SE_{1-12}$, and $CE_{1-4}$, corresponding to correspondingly designated SE and CE bit stages in CCR/CE, for controlling acceptance by IOCE of signals conveyed from respective SE's and CE's. All other bit positions are spare. Since stage $P_4$ and the associated eight stages 92 are not used, all nine of the stages may be omitted.

The CCR of each peripheral adapter, for example, CCR/TCU (FIG. 9), in addition to S, SC and P bit stages contains bit stages $IO_{1-3}$ in positions corresponding to those held by the IO bits in CCR/CE, for controlling acceptance by the respective TCU of signals supplied by $IOCE_{1-3}$, respectively. All other stages contain unused or spare bits. Since the stages 93 and 94 respectively associated with $P_2$ and $P_3$ are unused, all eighteen of these stages are unnecessary and may be omitted.

Considering the CCR formats (FIGS. 6–9) in relation to the associated elements of the complex as characterized in FIGS. 1–4, a number of pertinent observations may be made. An element (for example an SE) may be prevented by a CE bit in its CCR from receiving ordinary communications from a particular CE and yet be permitted by an SC bit in its CCR to accept a CM proffered by the same CE. Secondly, since the CCR's of all elements have similar control information formats—for example, the status and SC bits invariably occupy the first six register positions in all CCR registers, and CE bits, where available, are invariably located in the last four places of a group associated with parity stage $P_3$—a single pair of CM and SM words can be used to set a plurality of CCR's when circumstances permit (e.g., when the associated elements are grouped together in a subsystem). Thus, the network of gates and the programming required for entering information into a CCR may be simplified. Finally, it is repeated that while the adapter registers, such as CCR/TCU, have IO bits to control reception of IOCE originated information, the IOCE CCR's do not contain adapter bits for controlling information flow in the reverse direction. The reason for this is that the ordinary reciprocal controls between IOCE and adapter units are so arranged that if one cannot receive a communication from the other, it cannot provide a key sequence of responses necessary to actuate the other. It is, therefore, sufficient to provide CCR control in one direction only.

CCR/CE AND SETTING LOGIC

Referring to FIG. 10, the configuration control register $CCR/CE_1$ of a representative computing element $CE_1$, and the circuits controlling access thereto which are substantially identical in internal organization to similarly functioning circuits in the other CE's ($CE_{2-4}$), are seen to comprise detail features, as follows: For admitting new configuration control settings (CM's), proffered by any of the CE's including $CE_1$, to the 36-stage register 100, which is the $CCR/CE_1$ associated with $CE_1$, there are provided four AND circuits 101–104. The outputs of these control four respective groups of AND circuits 105–108. Each group of circuits 105–108 comprises 36 individual AND circuits for handling the individual bits of a CM signal presented to the group. Groups 105 to 108 are coupled to receive CM signals originating at respective CE's, $CE_1$ to $CE_4$, via respective groups of input wires 110 to 113. OR gates 115 combine respective outputs from each group of AND circuits 105–108 to provide a single 36-bit input path feeding into register 100.

AND circuits 101–104 are partially controlled by $CE_1$ bits in selection mask signal words (SM) issued by respective CE's, $CE_{1-4}$. As an additional partial control, signals corresponding to the outputs of bit stages $SC_{1-4}$ of register 100, except under conditions noted below, are applied to respective ones of circuits 101–104. As a third partial control, SCON enabling signals applied via line 119 to AND circuit 101, and SCON enabling signals transmitted by other CE's are applied via line 120 to the other three AND circuits 102–104. A fourth control input 121, to each AND circuit 101–104, is a TEST LATCH OFF signal provided by $CE_1$ control circuits shown in FIG. 11. This line is disabled only when the values of both status bits, $S_1$ and $S_2$ in $CCR/CE_1$ are coincidentally 0 while a $CE_1$ Test Switch (FIG. 11) is in an ON position, and it is restored to an enabled condition when the switch is thereafter placed in an OFF position.

An additional group of 36 inputs to OR circuits 115 not previously mentioned is supplied by lines 125. Signals on these lines correspond to respective manually keyed inputs 126 of 36 AND circuits indicated generally at 127, when the latter are enabled by a control signal on a common input line 129. Line 129 couples to the ON output of the TEST LATCH feeding line 121, so that the circuits 127 are enabled only when the line 121 becomes disabled; i.e., only when bits $S_1$ and $S_2$ in $CCR/CE_1$ are both 0 while the $CE_1$ Test Switch is ON. It is, therefore, clear that the contents of register 100 can be manually changed through action of keys or switch levers only under certain predetermined status bit and test switch conditions, this feature serving as an interlock or precautionary measure precluding accidental isolation of an element from $CE_1$ as a result of accidental manipulation of a $CCR/CE_1$ bit setting key.

The outputs of AND circuits 101–104 are also extended to OR circuit 133 which couples to the $CE_1$ configuration response line 75, also shown in FIG. 1. Upon application of a $CE_1$ selecting bit of any selecting mask SM to one of the AND circuits 101–104, and translation of a signal through the circuit, a response is conveyed via line 75 to the CE issuing the SM. This response is used to reset the $CE_1$ selecting bit in the register holding SM whereby the issuing CE is informed that $CE_1$ has accepted a proffered CM in $CCR/CE_1$.

When energized, reset line 135 sets each of bits $SC_{1-4}$ to 1, and each status bit $S_1$, $S_2$ to 0, so that if the $CE_1$ test switch is OFF, AND circuits 101–104 will all be enabled, permitting any CE to reconfigure $CCR/CE_1$.

A bypass circuit 137 translates the outputs of bit positions $SC_{1-4}$ of register 100 to the output bus 138. This circuit includes four OR circuits 139–142, effective to directly translate respective $SC_{1-4}$ outputs of register 100, so long as one or more of these outputs are in the 1 state, and an OR circuit 143 and complementing circuit 144 providing an indirect second input to OR circuits 139–142, which is active whenever all bit stages $SC_{1-4}$ in register 100 simultaneously contain zeroes. AND circuits 101–104 cannot all be simultaneously disabled by $CCR/CE_1$/bits $SC_{1-4}$, since the corresponding inputs are taken from the bypass circuit 137, and the four outputs of the latter invariably include a "1" signal. Thus, register 100 cannot be accidentally isolated from all CE's. As an additional feature, the circuits 137 produce an "all ones" output, upon detection of a CCR parity error, as suggested by input line 145 joining the output of complementing circuit 144.

Each of the other CE's, $CE_{2-4}$, while not illustrated in detail should be understood to comprise CCR gates and controls corresponding in function and organization to those shown in FIG. 10 for $CE_1$, except that the identities of inputs to the circuits corresponding to AND circuits 101–104 and 127 of $CE_1$ are different for each of the other CE's. For $CE_2$ and the AND circuits in the positions of AND circuits 101, 103 and 104 would be controlled jointly by $CE_2$ TEST LATCH OFF and SCON signals originating at other CE's, and individually by bits $CE_2$ in $SM/CE_1$, $SM/CE_3$ and $SM/CE_4$ respectively, and by bits $SC_1$, $SC_3$ and $SC_4$ from respective stages of $CCR/CE_2$. The AND circuits in the position of AND 102 would have inputs $SCON/CE_2$, $SM/CE_2$/bit $CE_2$ and $CCR/CE_2$/bit $SC_2$. The AND circuit corresponding to AND circuit 127 would be conditioned to pass $CE_2$ data key signals by $CE_2$ TEST LATCH ON, and the output of the OR circuit corresponding to OR circuit 133 would represent the reconfiguration response of $CE_2$.

For $CE_3$ the AND circuits corresponding to 101, 102 and 104 would be controlled jointly by $CE_3$ TEST LATCH OFF and SCON signals produced by $CE_1$, $CE_2$ or $CE_4$, and individually by bits $CE_3$ of $SM/CE_1$, $SM/CE_2$, and $SM/CE_4$, respectively, and outputs of bit stages $SC_1$, $SC_2$ and $SC_4$ respectively of $CCR/CE_3$. The inputs to the circuit corresponding to AND circuit 103 would be $SCON/CE_3$, $SM/CE_3$/bit $CE_3$, and $CCR/CE_3$/bit $SC_3$. The inputs to the circuit corresponding to AND circuit 127 would be $CE_3$ TEST LATCH ON and $CE_3$ DATA KEYS.

For $CE_4$ the counterparts of AND 101, 102 and 103 would have joint inputs $CE_4$ TEST LATCH OFF and SCON (controlled by $CE_1$, $CE_2$ or $CE_3$) as well as first individual inputs $SM/CE_1/bit$ $CE_4$, $SM/CE_2/bit$ $CE_4$, and $SM/CE_3/bit$ $CE_4$, respectively, and second individual inputs $CCR/CE_4/bit$ $SC_1$, $CCR/CE_4/bit$ $SC_2$, and $CCR/CE_4/bit$ $SC_3$ respectively. The counterparts of AND 104 would have inputs $SCON/CE_4$, $SM/CE_4/bit$ $CE_4$, and $CCR/CE_4/bit$ $SC_4$. The counterpart of AND 137 would have inputs $CE_1$ TEST LATCH ON and $CE_4$ DATA KEYS.

ISSUANCE OF SCON BY CE

Figure 11:
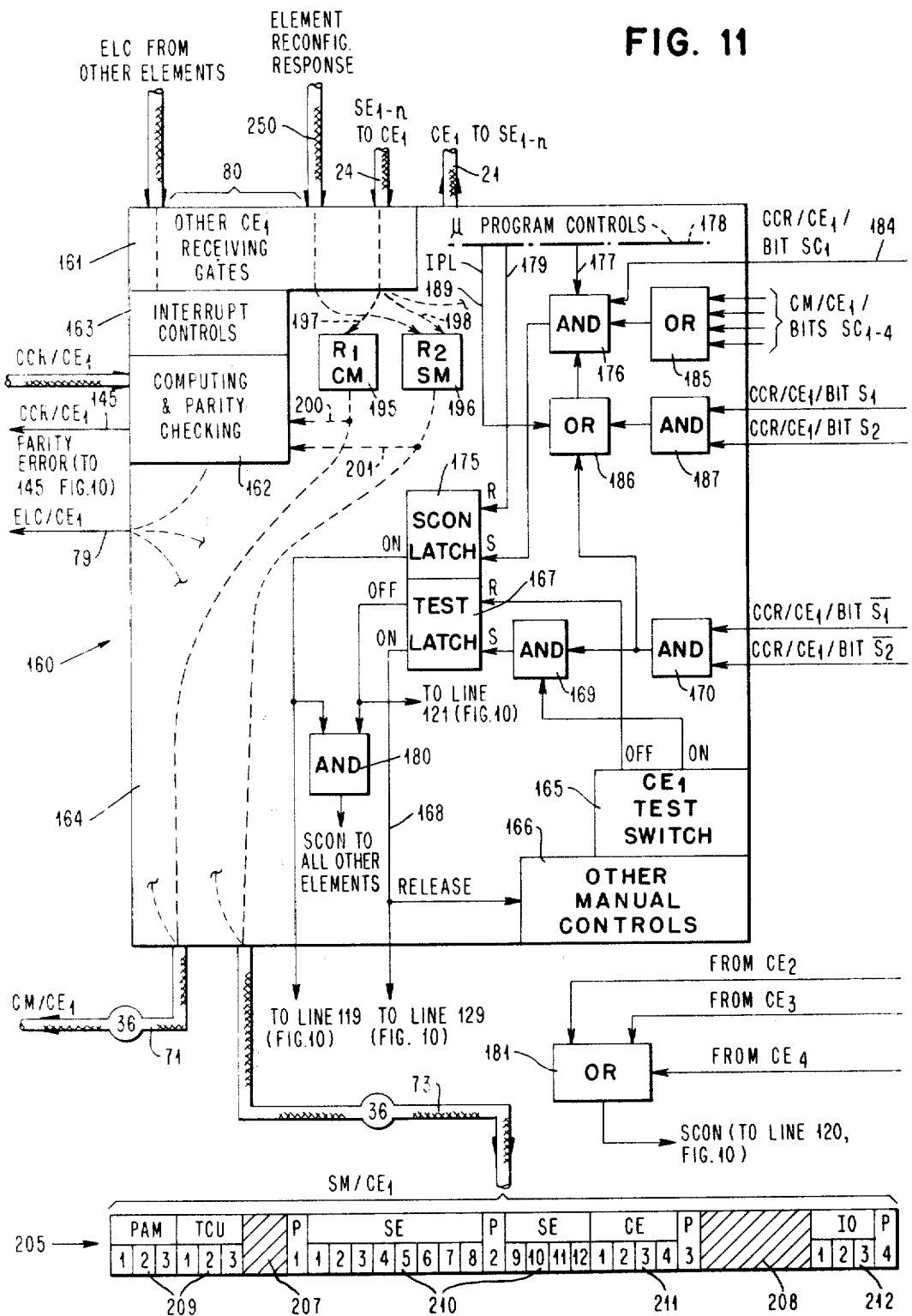
FIG. 11 is a schematic drawing illustrating parts of a representative computing element $CE_1$ which can control the acquisition and execution of SCON instructions for reorganizing the multiprocessing complex hereof.

Consideration is next given with reference to FIGS. 11 and 14 to the other internal parts 160 of $CE_1$ and by analogy to correspondingly functioning parts in the other CE's. These include circuits which participate in the acquisition and execution of SCON instructions and the collection and distribution of CM and SM words to selected CCR's throughout the complex, with consequent reorganization of the associated elements within the complex. The parts 160 are grouped into four main subdivisions designated receiving gates 161 (same as gates 12 in FIG. 1), computing and parity checking circuits 162, interrupt controls 163 and instruction decoding and other controls 164. The latter includes $CE_1$ Test Switch 165, other manual controls 166, and other electronic controls yet to be discussed. The circuits 162 carry out computing and parity checking functions on information handled within 160 including checks on the information content of the configuration control register 100 ($CCR/CE_1$) of FIG. 10. The circuits 164 provide all of the sequential control signals and include sufficient local buffer storage registers to enable $CE_1$ to carry out its computing and data handling functions effectively.

The other manual controls 166 includes switches for controlling power sources, single cycle operation, and other functions requiring manual control. The controls 166 are effective only when a bistable test latch 167 is in the ON state as indicated by a predetermined signal level on line 168. Latch 167 is set to the ON state by an active output from AND circuit 169. The latter occurs only when test switch 165 is in the ON condition and coincidentally an enabling output is received from AND circuit 170 in response to 0 indication from stages $S_1$ and $S_2$ of $CCR/CE_1$ (FIG. 10). Once in the ON state latch 167 can be reset to OFF only by setting the test switch 165 to its OFF position. Thus, the bits $S_1$ and $S_2$ can be varied for test purposes while the test latch remains in the ON state.

The OFF and ON outputs of test latch 167 also extend to the lines 121 and 129 respectively shown in FIG. 10. Whenever the condition of the test latch is reversed from ON to OFF line 171 in FIG. 10 is energized to reset bit states $S_1$ and $S_2$ of $CCR/CE_1$ to 0, whereby $CCR/CE_1$ remains accessible to either manual reconfiguration by turning the test switch 165 back to ON, or by programmed reconfiguration as considered below.

In addition to the test latch there is provided a SCON (Set Configuration) enabling latch 175 which can be set to an ON condition by an output from AND circuit 176. Circuit 176 is partially enabled by one signal 177 of a group of sequential microprograms signals schematically represented at 178. These signals are derived during a $CE_1$ microprogram of operations culminating in the fetching to $CE_1$ of a SCON instruction from one of the working storages $SE_{1-n}$ as described below. The signal 177 is invariably followed by a signal 179 which establishes latch 175 in the OFF or RESET state. In its ON state latch 175 provides a SCON enabling signal to input line 119 of AND circuit 101 in FIG. 10. If, in addition, test latch 167 is OFF, a remote SCON enabling signal is translated through AND circuit 180 to the receiving gates of all other element CCR's. In each CE the remote SCON signals of the other CE's are passed through an OR circuit connection such as 181 (FIG. 11) to a control line such as 120 (FIG. 10).

Other conditions for completing the actuation of AND circuit 176 to set latch 175 are determined by the signal on line 184 ($CCR/CE_1/bit$ $SC_1$) and the outputs of OR circuits 185 and 186. The output of OR circuit 185 is active if all of SC bits of the configuration mask $CM/CE_1$ conveyed to bus 71 (FIG. 10) are not simultaneously in the 0 state. The output of OR circuit 186 is active if either AND circuit 187 or AND circuit 170 is energized or if microprogram control line 189 is excited. AND circuit 187 or 170 will be enabled if the values of bits $S_1$ and $S_2$ are both simultaneously equal to 1 or simultaneously 0, respectively. Thus, OR circuit 186 and AND circuits 187 and 170 together comprise an inverse exclusive OR circuit acting upon the outputs of stages $S_1$ and $S_2$ of $CCR/CE_1$.

Line 189 is energized during manually initiated loading in an SE of a program scheduled for utilization by $CE_1$. Hence, this line is identified by the symbol IPL (abbreviation for Initial Program Loading Signal).

It should therefore be understood that SCON latch 175 is set to ON if microprogram signal 177 occurs while bit $SC_1$ of $CCR/CE_1$ and at least one of the bits $SC_{1-4}$ in $CM/CE_1$ are coincidentally in a 1 condition and either bits $S_1$ and $S_2$ in $CCR/CE_1$, are set to identical conditions or control line 189 is excited. It should also be understood that latch 175 is rest to OFF by a signal on line 179 invariably following the signal 177. While in the ON condition latch 175 controls translation of SM selecting bits via line 119, FIG. 10, and via lines corresponding to 120 of FIG. 10 in all other elements.

The handling of mask words CM and SM within the circuits 160 is characterized schematically as follows. CM and SM are acquired by programming from SE units permitted access to 160 by gates 161. CM and SM are forwarded under microprogram control into selected registers 195 and 196 respectively, which are designated $R_1$ and $R_2$ respectively. This is indicated schematically by respective broken lines 197 and 198. CM and SM are parity checked through circuit 162 as indicated by broken lines 200 and 201, and also also coupled to outgoing buses corresponding to buses 71 and 73 shown in FIG. 1. As previously indicated the positional format of the CM intelligence is the same for all elements with different bits masked upon entry into different element CCR's. Thus, each CM contains status bits (S), supervisory control bits (SC), SE bits, CE bits, and IO bits and parity bits in the positions shown in FIG. 6, but the element CCR's receiving a CM will receive selected portions of a CM and different CM's may be sent out to different elements during a reconfiguration program, as will be described below.

The format of SM is indicated at 205. SM is a 36-bit selection control word including eleven non-selecting bits consisting of four parity bits $P_{1-4}$, and seven spare bit positions indicated at 207 and 208, and twenty-five selection control bits which are coupled to individual element CCR access gates such as AND circuit 101 in FIG. 10, whereby selective translation to each CCR of a simultaneously issued CM may be effected. Thus, SM contains six peripheral device adapter selecting bits 209, twelve CCR/SE selecting bits 210, four CCR/CE selecting bits 211, and three CCR/IO selecting bits 212. The values of these bits are 1 for selection and 0 for non-selection of the associated element CCR's.

It would be helpful at this point to consider the program and microprogram processes by which a CE can reconfigure the complex. Referring to FIG. 14, this process is characterized in a nine step flow chart in which the sequential sub-program or microprogram steps taken by a CE are numbered 225–233, and discussed below in that order.

Each of the CE's under consideration is designed to operate as an independent central processing unit (CPU) on instructions of the IBM System/360 instruction set. This set of instructions and their implementation by a processor are characterized, for example, in copending patent application Ser. No. 357,372 of G. M. Amdahl et al., filed Apr. 6, 1964, which is assigned to the assignee of the present application. Thus, each CE is a processor having internal sets of controls for executing subprograms or micro-programs required for interpretation and execution of instructions in the above set. It is further noted that each CE is provided with additional subprogram or microprogram controls for interpreting and executing a SCON instruction, as defined and characterized below, which is not a member of the IBM System/360 instruction set.

It is assumed that prior to step 225 (FIG. 14) the CCR organization of the complex of FIGS. 1–4 is determinable. This means that if the complex is first starting into operation it would be necessary to operate manual reset switches in all elements to establish initial states of receptiveness in the CCR's of the CE's appropriate for initiating the reconfiguration sequence defined in FIG. 14. It is assumed that the complex is in operation prior to step 225 and a condition has occurred indicating possible need for reorganization.

In step 225 of FIG. 14, CE initiates a microprogram interrupt sequence of a predetermined class having sensed a signal associated with that class of interruption. This may involve sensing of an element check request (ELC) issued by an element other than the sensing CE or a SUPERVISOR CALL instruction belonging to the above universal set. The CE begins its interruption sub-routine after completing its last previous operation. As part of this sub-routine the last instruction address and certain other items of information are assembled from local registers into a 64-bit program status word (PSW) which is stored (step 226) at a unique location in an SE with which the CE is then capable of communicating by virtue of the known status of reception control settings in the CCR/CE and CCR/SE registers. The unique PSW location corresponds to the type or class of interruption.

At step 227 a new PSW is fetched to CE from another unique location in that SE also corresponding to the class of interruption.

At 228 the new PSW is set up in local buffer registers of the CE and the CE proceeds to recover the first instruction of a new program series stored in an SE, in accordance with instruction address intelligence contained in the new PSW. In this new series the CE is directed (step 229) to test the status bits of all elements of the complex, by referring to a status bit table in a predetermined series of SE locations. This table is shown in FIG. 16 and discussed below with reference to that figure. Depending on the present status of the complex and the particular type of condition which caused the interruption of step 225 program branches are taken to direct the CE to either terminate the current program series (exit 237) and begin an ordinary program sequence or to continue in sequence to address a SCON reconfiguration instruction located in SE.

Assuming that the sequence leading to step 230 is followed, a SCON instruction is fetched from SE to local buffers of CE and the PSW in CE is checked to assure that the supervisory mode bit is appropriately set. The SCON instruction has an 18-bit format, parts of which are indicated at 240. There are eight bits (241) defining an operation code (OP CODE), four bits 242 designating a first local register $R_1$ in CE, and four bits 243 designating a second local register $R_2$ in CE. Not shown at 240 are two parity bits indicating the correct parity of the other sixteen bits.

The registers denoted by $R_1$ and $R_2$ are the registers 195 and 196 shown in FIG. 11. These are preset under program control with respective 36-bit words representing a configuration mask (CM) and selection mask (SM) appropriate to the selected SCON instruction. Such loading may take place as part of step 229 or it may have been effected at some previous time as part of a program process of collecting several CM and SM words in several storage locations or registers.

During this phase of the process the SC bits ($SC_{1-4}$) in the CM word in $R_1$ are checked, to make sure that they define a legal configuration, by OR circuit 185 and AND circuit 176 of FIG. 11. Coincidentally, a current SC bit and status bits $S_1$, $S_2$ in CCR/CE, the SC bits in CM, and the current state of the CE test switch (165, FIG. 11) are checked by AND circuits 187 and 170, OR circuit 186, and AND circuit 176 (all FIG. 11) to verify that the CE is in a state in which it is permitted to execute SCON as discussed hereafter. If all checks are successful SCON latch 175 (FIG. 11) is set, and simultaneously (231) the CM intelligence accompanied by SM selecting bits is transferred out via appropriate buses (extensions of 71, 73, FIG. 11) and presented selectively to the individual CCR receiving gates of the complex. As each element response is received (232) via bus 250, FIG. 11, the corresponding SM selecting bit in $R_2$ is reset. Hence, execution of the SCON instruction may be considered complete when all bits in $R_2$ are set to 0. By storing the SM word in another register, CE can up-date the CCR status bits of the responding elements in the above-mentioned status table (step 233).

At this point it is necessary to determine whether the system has been completely reconfigured or only partially reconfigured. Hence, it is necessary to revert CE to state 229 (FIG. 14) and to again conditionally exit, or proceed to another SCON instruction 231. Eventually, after one or more passes through loop 229–233 an exit condition is reached terminating the configuring program.

The status table shown in FIG. 16 includes a pair of current status bits, $S_1$, $S_2$, for each element of the complex, the values of which correspond to conditions stored in the status bit stages of respective element CCR's. To condition program operation 229 on the states of these bits it is necessary for the programmer to keep in mind the desired end configuration of CCR bits and to program towards that end.

A word of explanation is in order at this point. In the exemplary embodiment under consideration there are five distinct states shown in the table of FIG. 15, and a programming convention used in the exemplary present organization is that all elements in the same state will receive only from each other. While this is not an essential restriction it simplifies the reconfiguration program considerably since the configuration mask (CM) for any element can be composed by entering ones in the CM bit positions assigned to other elements in the same state and zeros in all other bit positions. Without this restriction it would be necessary to program more of the CCR information into the status table of FIG. 16.

Now let us consider an example as follows. Assume that $CE_1$, $CE_2$, $SE_{1-5}$, $IO_1$, and all adapters except $TCU_1$, are in ACTIVE states with their respective pairs of status bits set to the condition "11" (note FIG. 16). This means that all of the real time processing is being handled by these elements, that each element in this group can receive intelligence from any other element of the group to which it has a data path connection, due to corresponding 1 bits in the CCR's, and that each element in the group is insensitive, by virtue of 0 bits in its CCR, to communications from elements not in the group. Now assume $CE_1$ has failed and it is desired to reassign $CE_1$ from the ACTIVE group to the TEST group while bringing in $CE_3$, presently in REDUNDANT state ($S_1=1$, $S_2=0$), as a replacement for $CE_1$. This may be accomplished by means of two SCON instructions executed in two passes through loop 229–233 of FIG. 14, as follows:

$CE_2$ may execute the reconfiguration program.

The CM word in register $R_1$ of $CE_2$ in the first execution of step 231 (FIG. 14) would have the form:

```
S  SC   P₁      SE     P₂  SE  CE  P₃    IO  P₄
1 1 0110 ///// 11111000 0000 0110 ///// 1 0 0
```

The SM word in register $R_2$ of $CE_2$ would have the form:

```
PAM TCU   P₁     SE     P₂  SE  CE  P₃    IO  P₄
1 1 1 0 1 1 ///// 11111000 0000 0110 ///// 1 0 0
```

This would reorganize the ACTIVE group ($S_1=1$, $S_2=1$) to include $CE_2$, $CE_3$, $SE_{1-5}$, $IO_1$, and all adapters except $TCU_1$. It is yet necessary, however, to move $CE_1$ from the active to the TEST group ($S_1=0$, $S_2=0$) so that its fault may be diagnosed. For this a second programming pass must be executed by $CE_2$ or another ACTIVE CE. Assume that the TEST group presently consists of $CE_4$, $SE_7$, $SE_8$, $IO_2$, and $TCU_1$. The CM word issued by CE to incorporate $CE_1$ into this group would have the form:

```
S  SC   P₁      SE     P₂  SE  CE  P₃    IO  P₄
0 0 0111 ///// 00000011 0000 1001 ///// 0 1 0
```

And the SM word for correctly distributing this CM throughout the complex would be:

```
PAM TCU   P₁     SE     P₂  SE  CE  P₃    IO  P₄
0 0 0 1 0 0 ///// 00000011 0000 1001 ///// 0 1 0
```

Assuming that the fault in $CE_1$ is not located in $CCR/CE_1$ or its access network, the above CM will be correctly accepted by $CE_1$ and the reconfiguration process may then be terminated. It might be mentioned that this assumption is a realistic one since this small segment of $CE_1$ will rarely fail. Upon termination of reconfiguration $CE_1$ will be ready to undergo manual tests or automatic tests under program control of $CE_4$. When $CE_1$ has been repaired it will usually be desirable to reconfigure $CE_4$ or $CE_1$ into the REDUNDANT group.

The question of priority relating to simultaneous requests for service by several elements was briefly touched upon above. It is worthwhile to note that IO and CE units will generally not impose significant conflicting request loads on an SE since the IO elements act in response to I/O instructions executed by the CE's. A priority resolution problem also occurs when several CE's attempt to share access to one SE simultaneously or in interleaved passes. This is a problem only when a CE is executing an extended program involving many references to SE, for example a data sorting program. It is not a problem for the procedure involved in FIG. 14.

Nevertheless it is noted for the sake of completeness that hardware is provided in each SE for selecting a unique access request from among any plurality of copending requests.

It may be observed that in the example above correspondingly ordered SC and CE bits in the second CM word do not have equal values. This results from a specialized programming restriction which is stated as follows: A CM issued to form an ACTIVE or REDUNDANT group will have SC bits set to 1 in the positions corresponding to all ACTIVE and REDUNDANT CE's (this permits a REDUNDANT CE upon receipt of ELC from a CE to reconfigure the complex by first resetting the CCR state bits of the receiving CE to the ACTIVE state (11) as indicated in Note 4 (FIG. 15)). A CM issued to form a TEST group may contain 1's in SC bit positions assigned to CE's in the TEST state as well as in other positions to permit recall of TEST elements to other states by CE's in other states. The question occurs, what happens when an additional non-failing element is required in the TEST group. The answer is that only a CE in the ACTIVE group could safely make such a reassignment since only such a CE can be presumed to be aware of current processing needs. It is advisable to add that an element in TEST state may be less "available" to the ACTIVE system than an element in REDUNDANT state since it may be accumulating important test data in a manner not susceptible to interruption, whereas processing in the REDUNDANT group is of the type which is considered instantaneously interruptable; for example, program debugging routines.

It should be obvious that if all CCR bits were stored with the status table of FIG. 16 considerably more sophisticated reconfiguration schedules could be followed. However, the present plan of organization simplifies the reconfiguration programming effort by limiting the number of passes through the reconfiguration subroutine to at most four (i.e., the number of distinct states defined by the CCR status bits: ACTIVE (11), REDUNDANT (01), REDUNDANT (10), and TEST (00) and is adequate for most multiprocessing purposes).

CCR/SE

Figure 12:
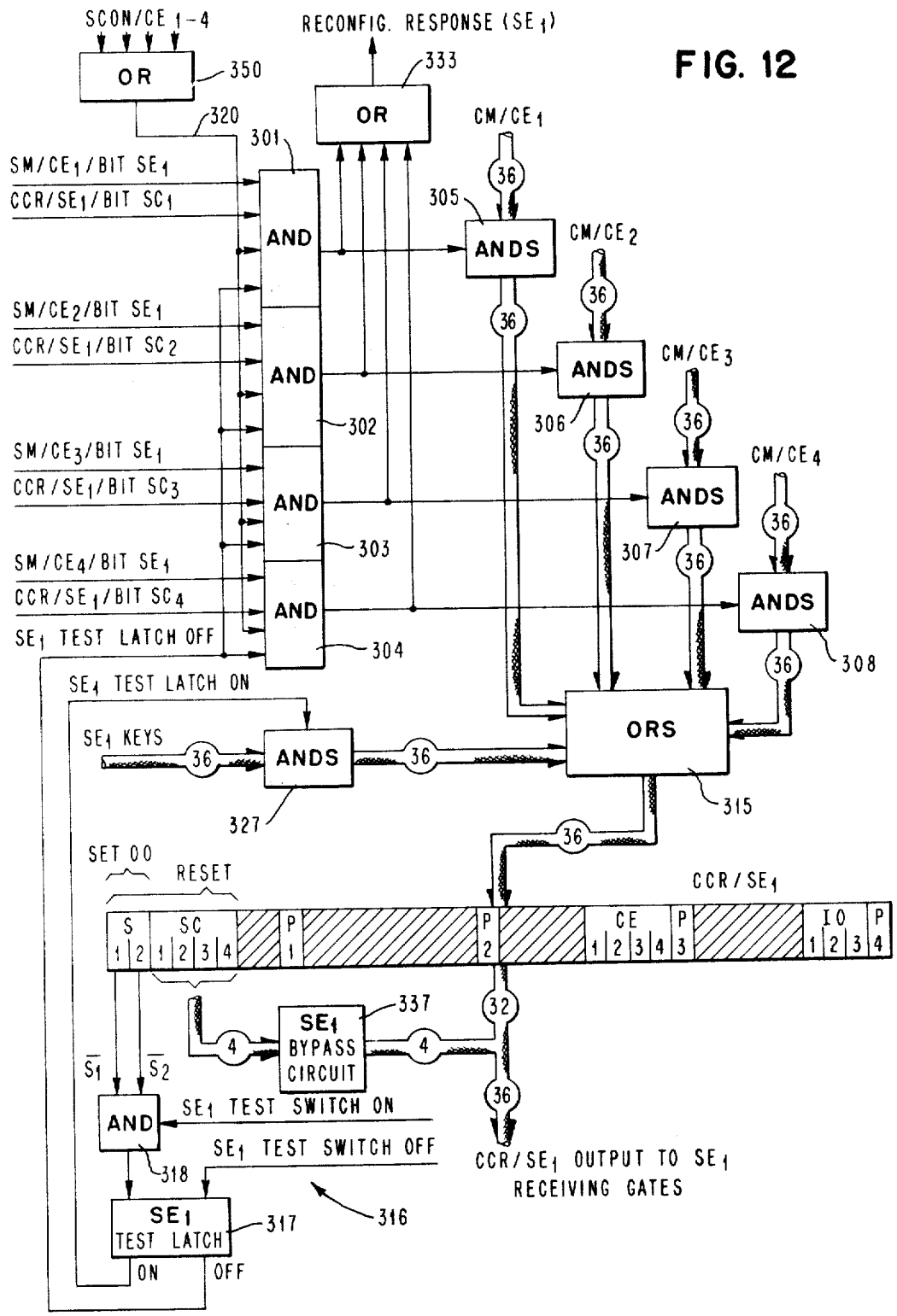
FIG. 12 is a schematic illustration of pertinent parts of a representative storage element configuration control register (CCR/$SE_1$) and associated access controls therefor.

Referring to FIG. 12, $CCR/SE_1$ is a register 300 in which the twelve SE bit positions are unused since one SE cannot communicate with other SE's. The groups of AND circuits 305–308 controlled by outputs of respective AND circuits 301–304 are adapted to selectively translate respective CM words $CM/CE_1$, $CM/CE_2$, $CM/CE_3$, and $CM/CE_4$, to OR circuits 315. AND circuits 301–304 are individually controlled by $SE_1$ bits in SM words issued by $CE_{1-4}$, respectively, and by bits $SC_1$, $SC_2$, $SC_3$ and $SC_4$ in $CCR/SE_1$ (register 300). AND circuits 301–304 are further jointly controlled by a TEST switch 316 acting through a TEST LATCH 317. With latch 317 OFF circuits 301–304 are each partially enabled. Latch 317 is set OFF when switch 316 is OFF and ON when AND circuit 318 responds to the occurrence of: TEST switch 316 ON and $CCR/SE_1$/bit $S_1 = CCR/SE_1$/bit $S_2 = 0$.

Manually keyed CCR changes are entered in $CCR/SE_1$ via AND's 327, corresponding functionally to AND's 127 of FIG. 10. OR 333 and bypass circuit 337 perform functions corresponding to those respectively provided by OR 133 and bypass circuit 137 of FIG. 10. Check circuits not shown provide the parity and other checks relevant to issuance of $ELC/SE_1$ (on a line also not shown). OR circuit 350 conveys SCON signals from $CE_{1, 2, 3 \text{ or } 4}$ via line 320 to AND's 301–304.

Figure 13:
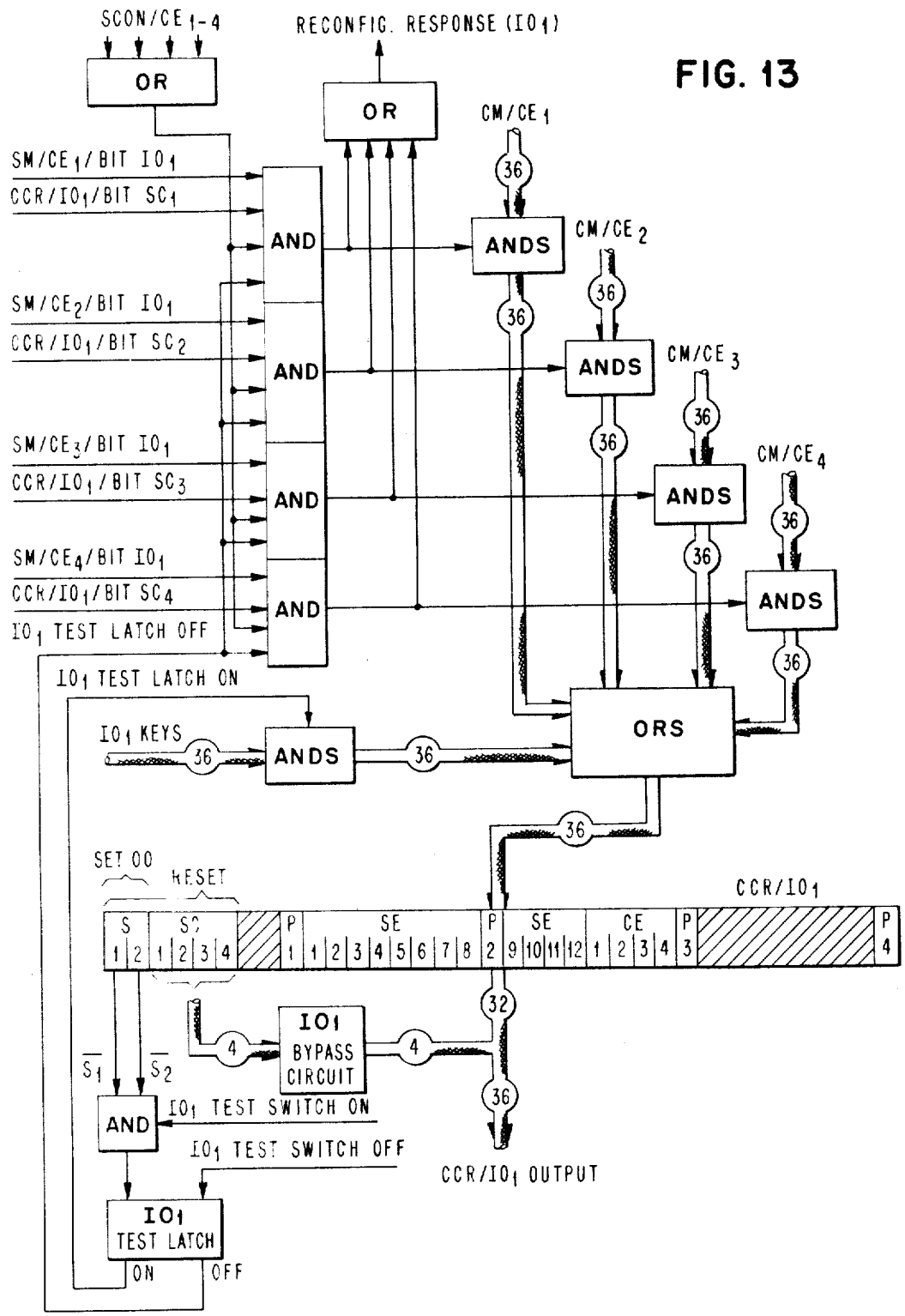
FIG. 13 is a schematic of pertinent parts of a representative input/output control element configuration control register (CCR/$IOCE_1$) and associated access controls.

As suggested in FIG. 13, the CCR circuits for a representative IO are substantially similar to the CCR/SE circuits of FIG. 12, except that the IO bit locations in CCR/IO are unused. This is because IO's need not exchange information between each other in the present organization. Of course, this is not an essential restriction since it may be desirable in some complexes to permit transfers between IO's.

Referring to FIG. 15, in the subject organization an element can be established in any of five distinct states: ACTIVE ($S_1=1$, $S_2=1$), REDUNDANT ($S_1=0$, $S_2=1$), REDUNDANT ($S_1=1$, $S_2=0$), TEST WITH LATCH OFF ($S_1=0$, $S_2=0$), and TEST WITH LATCH ON ($S_1=0$, $S_2=0$). REDUNDANT–10 differs from REDUNDANT–01 only in that the former state affords some access for manual control while the latter does not. CE's in either REDUNDANT state may not issue SCON, but may accept SCON from other CE's. TEST WITH LATCH OFF is a state which permits a CE to issue SCON externally (to other elements in the same state) whereas TEST WITH LATCH ON enables a CE to only issue SCON internally to its own CCR, if its own SC bit in CCR is 1.

As is further indicated in the table, an element in REDUNDANT-01 or TEST state can have certain manual operations performed therein under manual control, as noted in the column associated with note 5 of the table.

All elements will accept SCON in any state except TEST WITH LATCH ON provided that the SC bit corresponding to the issuing CE is set to 1 in the receiving elements CCR. In the expected state only a CE can accept SCON and only from itself. And despite such acceptance its CCR status bits will revert to 00 when the test switch is turned off. Element manual controls for power and CCR manipulation are ineffective in all but state TEST WITH LATCH ON. It is thus understood that this state is one in which the element is isolated from outside configuration control. TEST WITH LATCH OFF is a state which can be changed to TEST WITH LATCH ON merely by turning the test switch on, but it is also a state accessible to outside configuration control. A faulty element would be configured to this state both before and after it is tested.

Those skilled in the art to which this invention pertains will no doubt appreciate that while there are many known organizations of multiple computing and storing devices, the subject system of configuration control is readily applicable to and could easily be incorporated in any of them. The primary elements of configuration control, as contemplated herein, are individual control means in each processing element—e.g., configuration control registers—for controlling acceptance of information by each element, means for selective access to each individual control means from a plurality of computing or other program executing elements, and means integral to such computing or other program executing elements for selectively executing a program to condition the individual control means.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a complex of plural relatively independent data processing elements, including means for conveying information signals between elements, a configuration control system for selectively controlling the handling of information between elements comprising:

a plurality of first means, one for each said element, for selectively controlling transfers of signals between the respective elements and other elements;

at least two second means incorporated in respective at least two of said elements for issuing reconfiguration signals; and means in each element selectively responsive to said reconfiguration signals to selectively condition the respective first means of the element to a signal transfer control state determined by the reconfiguration signals.

2. In a complex of plural relatively independent data processing elements, including means for conveying information signals between elements, a configuration control system for selectively controlling the reception of information by each element from other elements comprising:

a plurality of configuration control means, one individually associated with each said element, for selectively controlling the reception of signals by the respective elements from other elements;

at least two means associated individually with at least two of said elements for issuing reconfiguration signals;

and means coupled between said at least two reconfiguration signal issuing means and said plurality of configuration control means for selectively conditioning said configuration control means in accordance with said reconfiguration signals to selectively vary the receptiveness of associated elements to signals transmitted by other elements.

3. In a complex of plural relatively independent data processing elements, including plural program executing elements and means for circulating information between elements, a configuration control system in which each element can be conditioned to selectively control its reception of information from other elements without interruption of data processing functions being performed by the conditioned element comprising:

a configuration control register individual to each element;

first means individual to each element for selectively controlling transfers of signals to the individual element in accordance with the information contents of the individual register;

second means individual to each element for controlling the entry of new information into the individual register; and means for coupling any of said program executing elements to all of said second means for selectively entering new information into said registers under stored program control.

4. In a complex of plural relatively independent data processing elements including plural program executing elements and means for communicating information between elements, a program-controllable configuration control system for selectively restricting communications between elements comprising:

a configuration control register individual to each element;

first means controlled by outputs of each register for selectively admitting signal transmissions of other elements into the element associated with the register;

second means controlled by outputs of each said register for selectively admitting new information entries into the associated register;

and means cooperative with said program executing elements and said individual second means of all elements for selectively varying the control settings in said registers under stored program control.

5. A configuration control system according to claim 4 wherein:

each element includes means for issuing an element check signal;

each program executing element includes means for selectively receiving check signals issued by other elements; and each program executing element includes means which can be operated in response to a received check signal to initiate a program culminating in the entry of new control settings into selected ones of said registers.

6. A system according to claim 4 including:

reset means for resetting said registers so as to enable the individual second means to admit entries into said registers irrespective of the conditions stored in the registers prior to such resetting.

7. A system according to claim 4 including:

manually operable switches individual to said elements; and means controlled by the individual registers for selectively preventing reactions to the conditions of said switches from taking place within the respective elements.

8. In a complex of plural relatively independent data processing elements including program executing elements and means for communicating information between elements, a program-controllable configuration control system for selectively restricting communications between elements in accordance with a program executed by any one of said program executing elements comprising:

a configuration control register individual to each element having control bits defining the receptiveness of the element to communications of other elements and status bits defining the sub-system assignment of the element in one of a plurality of sub-systems including an ACTIVE, a REDUNDANT, and a TEST sub-system, elements in the TEST sub-system being engaged in performing or receiving diagnostic tests, elements in the REDUNDANT sub-system being maintained in an interruptable condition, and elements in the ACTIVE system being engaged in primary data processing operations;

first means individual to each element and responsive to certain control bits in the individual register to control communication of information from other elements to the individual element;

second means individual to each element and responsive to other control bits in the individual register to control entry of information into the individual register; and means associated with the program executing elements for executing reconfiguration programs to produce and enter new information into said registers subject to the entry control asserted by said second means.

9. A system according to claim 8 wherein:

only program executing elements in other than the REDUNDANT sub-system are permitted to execute said programs to produce and convey new register entries.

10. A system according to claim 8 wherein:

the control bits in said registers are arranged to effectively organize the system into variable sub-systems.

11. A system according to claim 8 wherein:

the registers of said elements contain other control bits permitting execution of the reconfiguration program only by program executing elements in other than the REDUNDANT sub-system and acceptance of reconfiguration by ACTIVE elements only from program executing elements in other than the TEST sub-system.

12. A configuration control system, in a multiprocessing complex including plural storage elements and plural program executing elements, for controlling inter-element communications, comprising:

a configuration control register integral with each element;

first means in each element controlled by the said register for selectively controlling transfers of external information into said element;

second means in each element controlled by the said register for selectively controlling transfers of reconfiguration information into said register;

said complex being organized on a fail-safe basis by having a plurality of reconfiguration programs redundantly stored in a plurality of said storage elements and redundantly executable by any one of said plurality of program executing elements;

each said program executing element including means operable under program control to execute reconfiguration programs to transfer reconfiguration information to the registers of selected elements subject to the control of the second means associated with said registers.

13. In a multiprocessing complex including a first plurality of storage elements and a second plurality of program executing computing elements, a fail-safe configuration control system for controlling inter-element communications comprising:

a configuration control register integral to each element;

first means integral to each element for selectively controlling the transfer of information from other elements to the associated element in accordance with the conditions of bits in the associated register assigned on a one-to-one basis to the transmitting elements;

second means integral to each element for selectively controlling the transfer of information into said register in accordance with the instantaneous states of certain other bits in said register;

a first plurality of reconfiguration programs each redundantly stored in at least two of said storage elements and having first instructions located at addresses indexed by predetermined supervisory Program Status Words stored in said storage elements;

each said reconfiguration program including at least one configuration setting instruction (SCON);

each said program executing computing element including first means subject to control of the respective configuration control registers for executing the instructions in said reconfiguration programs upon retrieval of an associated Program Status Word from a storage element;

each said program executing element further including second means for retrieving one class of Program Status Words associated with reconfiguration programs in response to an interruption condition sensed within said program executing element and third means for retrieving another class of Program Status Words also associated with reconfiguration programs in response to a sequential program instruction (SUPERVISOR CALL);

each program executing element including fourth means for maintaining and utilizing status tables stored in said storage elements by means of which the present contents of each configuration control register can be made known to the program executing elements;

each first means for executing instructions being responsive to a SCON instruction to produce and broadcast to all elements a configuration mask word and selection mask word;

each element including means for entering the configuration mask word into the associated register in dependence upon a predetermined bit of the selection mask word and the condition of the associated second means.

14. In a multiprocessing complex including a plurality of elements having different processing functions, a configuration control system comprising:

a plurality of multi-bit registers, one individually associated with each said element;

first means integral to each element for selectively controlling the transfer of information from other elements to the associated element in accordance with a first group of bits in the associated register;

second means integral to each element for selectively controlling transfers of information into the associated register in accordance with a second group of bits therein;

check means accessible to each element including means for performing a parity check based on all bits in the associated register; and means in a plurality of said elements actuatable by said check means to transfer new information into selected registers subject to the acquiescence of the second means associated with the selected registers in such transfer.

15. In a multiprocessor including a plurality of relatively independent data handling elements, the combination useful for reliably controlling communication of intelligence relative to an element comprising:

control register means associated with one of said elements for controlling translation of intelligence signals between said one element and a plurality of others of said elements;

control input means associated with said one element for selectively conveying a plurality of conditioning input signals to said control register means; and a plurality of signalling means, individual to a plurality of other elements, coupled to said one element for supplying a plurality of conditioning input signals to said control input means for selection thereat to condition said control register means.

16. The combination of claim 15 wherein:

said other elements are adapted to operate said signalling means to supply conditioning input signals to said control input means;

said other elements each including an associated second signalling means for producing selection signals in association with the conditioning input signals produced by the associated first-mentioned signalling means;

said selection signals serving to actuate said input means to translate said input signals selectively to said register means;

said conditioning input signals having a predetermined word structure in which certain segments have variable intelligence or non-intelligence (masked) significance and in which at least one other segment has fixed parity significance relative tp other segments.

17. In a multiprocessor including a plurality of relatively independent data handling elements, the combination useful for reliably controlling communication of intelligence relative to an element comprising:

control register means associated with one of said elements for controlling gates within said one element directing external signals produced by other elements inwardly to said one element;

control input means individual to said one element for selectively conveying conditioning input signals to said control register means; and a plurality of signalling means, individual to a plurality of other elements, coupled to said one element for supplying input conditioning signals to said control input means to condition said control register means.

References Cited

UNITED STATES PATENTS

| 3,312,943 | 4/1967 | McKindles et al. | 340—172.5 |
| 3,303,474 | 2/1967 | Moore et al. | 340—172.5 |
| 3,286,236 | 11/1966 | Logan et al. | 340—172.5 |
| 3,252,149 | 5/1966 | Weida et al. | 340—172.5 |
| 3,251,040 | 5/1966 | Burkholder et al. | 340—172.5 |

ROBERT C. BAILEY, *Primary Examiner.*

G. D. SHAW, *Assistant Examiner.*

Notice of Adverse Decision in Interference

In Interference No. 96,917 involving Patent No. 3,386,082, T. S. Stafford, D. C. Burnstine, G. T. Paul and J. R. Rogaski, CONFIGURATION CONTROL IN MULTIPROCESSORS, final judgment adverse to the patentees was rendered Jan. 27, 1972, as to claims 1, 2, 3, 15 and 17.

[*Official Gazette July 4, 1972.*]